United States Patent [19]

Iacoveillo et al.

[11] Patent Number: 5,182,328
[45] Date of Patent: Jan. 26, 1993

[54] RF CURABLE TYPE I WOOD ADHESIVE COMPOSITION COMPRISING VINYL ACETATE/NMA COPOLYMER EMULSIONS CONTAINING TETRAMETHYLOL GLYCOLURIL

[75] Inventors: John G. Iacoveillo, Allentown; David W. Horwat, Emmaus, both of Pa.

[73] Assignee: Air Products and Chemicals, Inc., Allentown, Pa.

[21] Appl. No.: 846,307

[22] Filed: Mar. 4, 1992

[51] Int. Cl.⁵ .............................................. C08L 33/24
[52] U.S. Cl. ................................... 524/803; 524/827; 524/459; 525/375; 526/204; 526/304
[58] Field of Search ................. 524/91, 459, 720, 803, 524/827; 526/204, 304; 525/375

[56] References Cited

U.S. PATENT DOCUMENTS

| | | | |
|---|---|---|---|
| 3,830,761 | 8/1974 | Lenney | 524/834 |
| 4,064,191 | 12/1977 | Parekh | 525/186 |
| 4,254,235 | 3/1981 | Turpin | 525/162 |
| 4,310,450 | 1/1982 | Wang et al. | 524/91 |
| 4,444,941 | 4/1984 | Borovicka et al. | 526/304 |
| 4,487,889 | 12/1984 | Craien | 524/388 |
| 4,683,260 | 7/1987 | Wickert | 524/515 |
| 4,962,141 | 10/1990 | Iacoviello et al. | 524/512 |

*Primary Examiner*—Veronica P. Hoke
*Attorney, Agent, or Firm*—Michael Leach; James C. Simmons; William F. Marsh

[57] ABSTRACT

An aqueous vinyl acetate/N-methylolacrylate copolymer emulsion for RF curable Type I wood adhesive compositions prepared by the polymerization of vinyl acetate and N-methylolacrylamide in the presence of 1 to 5 wt% tetramethylol glycoluril and a stabilizing system consisting essentially of 3 to 5 wt% polyvinyl alcohol, the weight percentages being based upon vinyl acetate monomer.

20 Claims, No Drawings

RF CURABLE TYPE I WOOD ADHESIVE COMPOSITION COMPRISING VINYL ACETATE/NMA COPOLYMER EMULSIONS CONTAINING TETRAMETHYLOL GLYCOLURIL

TECHNICAL FIELD

The present invention relates to aqueous vinyl acetate/-N-methylolacrylamide (VAc/NMA) copolymer emulsions and RF curable Type I wood adhesive compositions.

BACKGROUND OF THE INVENTION

Previous aqueous VAc/NMA copolymer emulsions prepared in the absence of any protective colloid or surfactant required the addition of a functional monomer, for example, acrylic acid, to obtain emulsion stability and cleanliness. These emulsions, however, had undesirably high emulsion viscosities and were unsuitable as RF curable wood adhesives. To be suitable as an RF curable wood adhesive a VAc/NMA copolymer emulsion must exhibit manufacturing stability and long term viscosity stability and the polymer must be of high molecular weight and demonstrate rapid cure. To provide a wood adhesive having acceptable flow properties for machine application, the VAc/NMA copolymer emulsion should have a viscosity of 5,000 to 6,000 cps which will drop to a suitable viscosity when the acidic metal salt catalyst (aluminum chloride) is added.

Relatively stable, but difficult to prepare and reproduce, aqueous VAc/NMA copolymer emulsions were prepared using the protective colloid, polyvinyl alcohol (PVOH). The addition of a small amount of an ethoxylated nonylphenol nonionic surfactant led to emulsions that were more reproducible and approached all of the desired properties of an RF curable Type I wood adhesive but did not achieve them.

SUMMARY OF THE INVENTION

The present invention provides PVOH-stabilized aqueous emulsions containing a vinyl acetate/N-methylolacrylamide (VAc/NMA) copolymer and tetramethylol glycoluril (TMGU) demonstrating an improved combination of properties as an RF curable Type I wood adhesive. The manufacture of these emulsions is reproducible. The VAc/NMA copolymer emulsions have low grit values, excellent viscosity stability and good catalyzed pot life, and give unexpectedly high green strengths after RF curing. These emulsions also pass Type I and Type II wood adhesive performance testing.

The TMGU is added to the VAc/NMA copolymer emulsion polymerization recipe, i.e. it is present during the polymerization reaction, rather than post-added. Having the TMGU present during the polymerization results in better incorporation of the TMGU into the polymer and gives an emulsion viscosity that is desired. Doing so also allows for the use of lower levels of NMA in the copolymer and lower levels of PVOH in the stablizing system while still obtaining acceptable emulsion viscosity, manufacturing stablility and emulsion storage stability. Post-adding the TMGU (using the same stabilizing system) would yield an unstable and low viscosity emulsion.

The emulsions are aqueous colloidal dispersions containing 40 to 60% solids of an emulsion copolymer consisting essentially of 90 to 98 wt % vinyl acetate and 2 to 10 wt % NMA prepared in the presence of 1 to 5 wt % TMGU and a stabilizing system consisting essentially of 3 to 5 wt % PVOH, the wt % of TMGU and PVOH being based upon vinyl acetate monomer.

Wood adhesive compositions would comprise the VAc/NMA/TMGU emulsion and optionally, other components typically used in the art including fillers, crosslinking resins and acidic metal salt catalysts.

DETAILED DESCRIPTION

The PVOH-stabilized aqueous dispersion, or emulsion, of a VAc/NMA copolymer and TMGU is prepared by polymerizing vinyl acetate and NMA in the presence of TMGU and a PVOH stabilizing system. The emulsions are prepared by incorporating during the polymerization process 1 to 5 wt %, preferably 1 to 3 wt %, TMGU into an aqueous colloidal dispersion containing 40 to 60% solids of a copolymer prepared by the emulsion polymerization of a monomer mixture sufficient to provide a copolymer consisting essentially of 90 to 98 wt % vinyl acetate and 2 to 1 wt % NMA. The copolymer is prepared in the presence of a stabilizing system consisting essentially of 3 to 5 wt % PVOH which is preferably 70 to 91 mole % hydrolyzed.

The preferred emulsions are prepared by incorporating 1 to 3 wt % TMGU into an aqueous colloidal dispersion containing 50 to 55% solids of a copolymer consisting essentially of 94 to 98 wt % vinyl acetate and 2 to 6 wt % NMA prepared in the presence of a stabilizing systems consisting essentially of 3 to 5 wt % PVOH which is 85 to 89 mole % hydrolyzed. Suitable PVOH's would have a degree of polymerization (DPn) ranging from 150 to 2000, preferably 220 to 1400. It is also preferred to use a stabilizing system comprising two 85-89 mole % hydrolyzed PVOH's, one having a DPn of 150 to 610 (low mol wt) and the other having a DPn of 1000 to 1800 (medium mol wt), in a wt ratio ranging from 20:80 to 50:50, preferably 35:65 to 40:60.

The VAc/NMA copolymers may optionally contain up to 5 wt %, preferably about 1 to 3 wt %, of suitable comonomers such as acrylamide, hydroxethylacrylate, hydroxypropylacrylate and carboxylate-containing monomers such as acrylic acid.

Tetramethylol glycoluril (TMGU) is added in-situ during the polymerization of the vinyl acetate and NMA, preferably by the delay addition of a mixture of NMA and TMGU. A method for preparing TMGU is disclosed in U.S. Pat. No. 4,064,191. TMGU is also sold commercially by American Cyanamid Company under the trademark CYMEL ® 1172 resin and is represented by the formula:

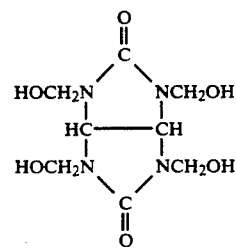

A lower level of NMA can be used when TMGU is added to the emulsion polymerization recipe without sacrificing emulsion stability and performance and, in fact, these areas may be improved. Previous attempts to prepare emulsions at NMA levels below 6% gave emulsions that were gritty, difficult to prepare and marginal in adhesive performance testing. The TMGU, although not a monomer, improves the emulsion stability when added to the polymerization recipe and improves the emulsion performance properties. Further, being a tetramethylol functional compound, it reacts with the NMA for a tighter crosslinked polymer network as evidenced by improved performance properties.

Suitable VAc/NMA copolymer emulsions are prepared by copolymerizing the monomers in the presence of the PVOH stabilizing system. Substantially all of the PVOH and a portion of the vinyl acetate monomer is initially charged to the polymerization vessel. Most advantageously, at least about 10 to 30 wt % and preferably, at least about 15 wt % of the total vinyl acetate to be polymerized is initially charged to the reactor. The remainder of the vinyl acetate is added, desirably at a substantially uniform rate over a period of time.

The polymerization reaction is performed at temperature ranging from 55° to 75° C., preferably about 65° C., and at essentially atmospheric pressure.

Various free-radical generating materials can be used in carrying out the polymerization of the monomers, such as peroxide compounds. Combination systems employing both reducing agents and oxidizing agents can also be used, i.e., a redox system and are preferred. The oxidizing agent is generally employed in an amount of 0.01 to 1%, preferably 0.05 to 0.5%, based on the weight of vinyl acetate monomer introduced into the polymerization system. The reducing agent is ordinarily added in the necessary equivalent amount.

When reference is made to incremental addition, whether of vinyl acetate, any comonomer, or free-radical source, substantially uniform additions, both with respect to quantity and time, and intermittent additions are contemplated. Such additions are also referred to a "delay" additions.

It is preferred that the NMA and the TMGU be added to the polymerization reaction as delay additions.

The RF curable Type I wood adhesive compositions containing the VAc/NMA copolymer emulsions of the invention would also contain other components well known in the art, for example, crosslinking resins such as melamineformaldehyde resins and phenolic resins, fillers such as starch and nut shell flour, and acidic metal salt catalysts such as aluminum chloride, chromium nitrate, magnesium chloride and the like, all in amounts well known in the art.

In Examples 1 and 2 the following PVOH's were used:

| AIRVOL ® PVOH | MOLE % HYDROLYSIS | DPn |
| --- | --- | --- |
| 203 | 87–89 | 220 |
| 205 | 87–89 | 550 |
| 523 | 87–89 | 1400 |
| 540 | 87–89 | 2000 |

EXAMPLE 1

To a one gallon glass reactor equipped with a thermometer, reflux condenser, electronic temperature controller, and metering pumps rather the following ingredients:

| | |
| --- | --- |
| Vinyl acetate | 395 g |
| Disodium phosphate | 4.2 g |
| Ferrous ammonium sulfate (5% aq soln) | 12 g |
| Airvol 523 (10% aq soln) | 604 g |
| Airvol 203 (10% aq soln) | 369 g |
| Water | 490 g |

The reactor contents were heated to 65° C. under a nitrogen blanket and 3 g sodium metabisulfite and 15 g water were then added. The polymerization was initiated with approximately 0.7ml of a t-butylhydroperoxide (t-BHP) solution consisting of 0.55 g t-BHP (70%) and 87.4 g water. The initiator system was added over 5 hours 40 minutes.

At polymerization initiation there were added (simultaneously with the initiator and subsurface to the reaction medium) three separate feed delays:

| | |
| --- | --- |
| Delay I | |
| Vinyl acetate | 1810 g |
| Delay II | |
| N-methylolacrylamide (48%) | 183 g |
| Cymel 1172 TMGU (45%) | 100 g |
| Water | 383 g |
| Delay III | |
| Sodium metabisulfite | 1.4 g |
| Disodium phosphate | 1.02 g |
| Water | 76.6 g |

Delay I was added over 4 hours; Delay II was added over 5 hours; and Delay III was added over 4 hours.

The reaction temperature was maintained at 65° C. with a jacket temperature of 55°–65° C. The vinyl acetate free monomer was 12% at the end of the first hour and the vinyl acetate free monomer averaged between 6–10% for the remainder of Delay I. The vinyl acetate free monomer content was controlled by the appropriate addition of the initiator. 191 g of the NMA/Cymel 1172 Delay II solution was added over the first hour with the remainder uniformly added over the remaining 4 hours. At the end of 4 hour 40 minutes the vinyl acetate free-monomer was below 0.5% and the emulsion pH was 4.8. The pH of the emulsion was adjusted to 5.6 with 20% ammonium hydroxide. The resulting emulsion (Run 15) was 52% solids. Approximately 300 ppm of total grits were obtained after filtering through both a 100 and 325 mesh screen. Emulsion viscosity was 6320 cps, Brookfield viscosity at 20 rpm.

EXAMPLE 2

Numerous vinyl acetate polymer emulsions (Runs 1–14) were prepared in the presence of PVOH's, surfactants and TMGU as shown in following Table 1 following the general procedure of Example 1 (Run 15).

TABLE 1

| Run | Total PVOH on VAM (%) | Airvol PVOH[a] | Surfactant[b] on VAM (%) | NMA on VAM (%) | TMGU on VAM (%) | Emulsion Solids (%) |
| --- | --- | --- | --- | --- | --- | --- |
| 1 | 4.4 | 523/205 (44/56) | — | 6 | — | 53 |
| 2 | 3.1 | 523/205 (75/25) | CO 997 (0.5) | 6 | — | 53 |

TABLE 1-continued

| Run | Total PVOH on VAM (%) | Airvol PVOH[a] | Surfactant[b] on VAM (%) | NMA on VAM (%) | TMGU on VAM (%) | Emulsion Solids (%) |
|---|---|---|---|---|---|---|
| 3 | 4.4 | 523/205 (60/40) | — | 6 | — | 53 |
| 4 | 4.4 | 523/205 (43/57) | CO 997 (0.5) | 6 | — | 53 |
| 5 | 4.4 | 523/203 (43/57) | CO 997 (0.5) | 6 | — | 53 |
| 6 | 4.4 | 523/203 (43/57) | CO 997 (0.5) | 6 | — | 53 |
| 7 | 4.4 | 523/203 (57/43) | CO 997 (0.5) | 6 | — | 53 |
| 8 | 4.4 | 523/203 (43/57) | CO 997 (0.5) | 6 | — | 52 |
| 9 | 4.4 | 523/203 (78/22) | — | 4 | 3 | 53 |
| 10 | 4.4 | 523/203 (78/22) | — | 4 | 2 | 52 |
| 11 | 4.4 | 523/203 (57/43) | — | 4 | 2 | 52 |
| 12 | 4.4 | 523/203 (67/33) | — | 4 | 2 | 52 |
| 13 | 4.4 | 523/203 (62/38) | — | 4 | 2 | 52 |
| 14 | 4.4 | 523/203 (62/38) | — | 4 | 2 | 52 |
| 15 | 4.4 | 523/203 (62/38) | — | 4 | 2 | 52 |
| 16 | 4.4 | 523/540 (78/22) | — | 3 | 3 | 52 |
| 17 | 4.4 | 523/203 (62/38) | — | 4 | 2 | 52 |
| 18 | 3.4 | 523/203 (62/38) | — | 4 | 2 | 53 |
| 19 | 4.4 | 523/540 (62/38) | — | 2 | 2 | 52 |

[a](wt/wt)
[b]Igepal CO 997 nonylphenoxy poly(ethyleneoxy) ethanol

EXAMPLE 3

The vinyl acetate emulsions of Runs 1–15 were tested for radio frequency green strength, boiling water (Type I) and cold water (Type II) strengths according to the following procedures:

Radio Frequency Green Strength Procedure: 200 g of emulsion are catalyzed with 10 g of 32° Baume aluminum chloride solution. The viscosity and pH of the catalyzed emulsion are recorded. Six pieces of Hard Rock maple are selected to be bonded in the 5 KW L&L radio frequency GluAll laminator. The maple is 12×2.5×0.75 in. (30.5×6.4×1.9 cm). Three pieces are face glued with a 6 mil coating of catalyzed adhesive. Three bonds are formed quickly by hand to minimize the open time of the adhesive. The three bonds are placed in the radio frequency machine and joined. The cure cycle can vary but 30 seconds is the standard condition. After the cure is affected, 2 of the 3 bonded assemblies are selected and cut into test constructions which satisfy the standard method of ASTM D905. Twelve ASTM D905 blocks are cut from the two bonded assemblies and are broken in an Instron tensile tester at 0.5 in/min (1.3 cm/min). The time lapse since the boards were removed from the RF press and the tensile strength are recorded. The bond should be totally tested within a fifteen minute period from removal from the RF press. The tensile strength numbers are averaged and recorded.

Boiling Water (Type I) Testing: This test is usually run simultaneously with the cold water testing. 200 g of emulsion are catalyzed with 10 g of 32° Baume aluminum chloride solution. The viscosity and pH of the catalyzed emulsion are recorded. Two pieces of Douglas fir are selected to be bonded in the 5 KW L&L radio frequency GluAll laminator. The fir is 12×2.5×0.75 in. A piece is face glued with a 6 mil coating of catalyzed adhesive. The bond is formed quickly by hand to minimize the open time of the adhesive. The bond is placed in the radio frequency machine and joined. The cure cycle can vary but 2 minutes is the standard condition. After the cure is affected, the bonded assemblies are allowed to age for 7 days at 25° C. and 50% relative humidity. The assemblies are then selected and cut into test constructions which satisfy the standard method of ASTM D905. Twelve ASTM D905 blocks are cut from each bonded assembly. The specimens are subjected to two cycles of immersion in boiling water for 4 hours immersion followed by 16 hours of drying at 120° F. (49° C.). After the second boiling water cycle the specimens are immersed in cool water for 30 minutes to cool them and broken in an Instron tensile tester at 0.5 in/min (1.3 cm/min). The tensile strength numbers are averaged and recorded along with the degree of wood fiber tear.

Cold Water (Type II) Testing: 200 g of emulsion are catalyzed with 10 g of 32° Baume aluminum chloride solution. The viscosity and pH of the catalyzed emulsion are recorded. Two pieces of Douglas fir are selected to be bonded in the 5 KW L&L radio frequency GluAll laminator. The fir is 12×2.5×0.75 in. (30.5×6.4×1.9 cm). A piece is face glued with a 6 mil coating of catalyzed adhesive. The bond is formed quickly by hand to minimize the open time of the adhesive. The bond is placed in the radio frequency machine and joined. The cure cycle can vary but 2 minutes is the standard condition. After the cure is affected, the bonded assemblies are allowed to age for 7 days at 25°

C. and 50% relative humidity. The assemblies are then selected and cut into test constructions which satisfy the standard method of ASTM D905. Twelve ASTM D905 blocks are cut from each bonded assembly. The specimens are subjected to three cycles of exposure to a vacuum soak in room temperature water of 4 hours immersion followed by 16 hours of drying at 120° F. (49° C.). After the third water soak cycle the specimens are broken in an Instron tensile tester at 0.5 in/min (1.3 cm/min). The tensile strength numbers are averaged and recorded along with the degree of wood fiber tear.

TABLE 2

| RUN | RF Green Strength | Type I | Type 2 |
| --- | --- | --- | --- |
| 1 | 2254 | 191 | 371 |
| 2 | 1941 | 282 | 412 |
| 3 | 1767 | 302 | 151 |
| 4 | 2115 | 245 | 458 |
| 5 | 2021 | 168 | 183 |
| 6 | 1924 | 123 | 205 |
| 7 | 1856 | 139 | 135 |
| 8 | 1846 | 325 | 517 |
| 9 | 2070 | 265 | 462 |
| 10 | 2446 | 343 | 444 |
| 11 | 2758 | 195 | 276 |
| 12 | 2488 | 343 | 444 |
| 13 | 2414 | 243 | 201 |
| 14 | 2446 | 245 | 444 |
| 15 | 2710 | — | — |

It can be seen from the data in the above tables that the VAc/NMA copolymer emulsions prepared in the presence of TMGU provided for unexpectedly improved RF green strength while maintaining good Type I and Type II bond strengths.

STATEMENT OF INDUSTRIAL APPLICATION

The present invention provides an aqueous vinyl acetate/N-methylolacrylamide copolymer emulsion showing high green strength after radio frequency curing and acceptable Type I and Type II performance testing as a wood adhesive.

We claim:

1. In an aqueous vinyl acetate/N-methylolacrylamide copolymer emulsion for RF curable Type I wood adhesive compositions, the improvement which comprises a copolymer emulsion prepared by the aqueous emulsion polymerization of the vinyl acetate and N-methylolacrylamide in the presence of 1 to 5 wt % tetramethylol glycoluril and a stabilizing system consisting essentially of 3 to 5 wt % polyvinyl alcohol, wt % based upon vinyl acetate monomer.

2. The copolymer emulsion of claim 1 which is prepared in the presence of 1 to 3 wt % tetramethylol glycoluril.

3. The copolymer emulsin of claim 1 in which the polyvinyl alcohol has a DPn of 150 to 2000.

4. The copolymer emulsin of claim 1 in which the polyvinyl alcohol is 70 to 91 mole % hydrolyzed.

5. The copolymer emulsion of claim 1 in which the polyvinyl alcohol is 85 to 89 mole % hydrolyzed.

6. The copolymer emulsion of claim 5 in which the stabilizing system consists essentially of a polyvinyl alcohol having a DPn of 150 to 610 and a polyvinyl alcohol having a DPn of 1000 to 1800 in a 20:80 to 50:50 weight ratio.

7. The copolymer emulsion of claim 6 in which the weight ratio is 35:65 to 40:60.

8. An aqueous vinyl acetate/N-methylolacrylamide copolymer emulsion for RF curable Type I wood adhesive compositions prepared by the aqueous emulsion polymerization of sufficient vinyl acetate and N-methylolacrylamide to yield a copolymer containing 90 to 98 wt % vinyl acetate and 2 to 10 wt % N-methylolacrylamide, the emulsion polymerization being performed in the presence of 1 to 5 wt % tetramethylol glycoluril and a stabilizing system consisting essentially of 3 to 5 wt % polyvinyl alcohol which is 70 to 91 mole % hydrolyzed and has a DPn of 150 to 2000, wt % based upon vinyl acetate monomer.

9. The copolymer emulsion of claim 8 which is prepared in the presence of 1 to 3 wt % tetramethylol glycoluril.

10. The copolymer emulsion of claim 9 in which the polyvinyl alcohol is 85 to 89 mole % hydrolyzed.

11. The copolymer emulsion of claim 10 in which the stabilizing system consists essentially of a polyvinyl alcohol having a DPn of 150 to 610 and a polyvinyl alcohol having a DPn of 1000 to 1800 in a 20:80 to 50:50 weight ratio.

12. The copolymer emulsion of claim 11 in which the weight ratio of the polyvinyl alcohols is 35:65 to 40:60.

13. The copolymer emulsion of claim 8 in which the copolymer also contains up to 5 wt % of a comonomer which is acrylamide, hydroxethylacrylate, hydroxypropylacrylate or a carboxylate-containing monomer.

14. An aqueous vinyl acetate/N-methylolacrylamide copolymer emulsion for RF curable Type I wood adhesive compositions prepared by the aqueous emulsion polymerization of sufficient vinyl acetate and N-methylolacrylamide to yield a copolymer containing 92 to 98 wt % vinyl acetate and 2 to 8 wt % N-methylolacrylamide, the emulsion polymerization being performed in the presence of 1 to 3 wt % tetramethylol glycoluril and a stabilizing system consisting essentially of 3 to 5 wt % polyvinyl alcohol which is 85 to 89 mole % hydrolyzed and has a DPn of 150 to 2000, wt % based upon vinyl acetate monomer.

15. The copolymer emulsion of claim 14 in which the stabilizing system consists essentially of a polyvinyl alcohol having a DPn of 150 to 610 and a polyvinyl alcohol having a DPn of 1000 to 1800 in a 20:80 to 50:50 weight ratio.

16. The copolymer emulsion of claim 11 in which the weight ratio of the polyvinyl alcohols is 35:65 to 40:60.

17. The copolymer emulsion of claim 16 in which the copolymer also contains up to 5 wt % of a comonomer which is acrylamide, hydroxethylacrylate, hydroxypropylacrylate or acrylic acid.

18. The copolymer emulsion of claim 16 in which the copolymer contains 94 to 98 wt % vinyl acetate and 2 to 6 wt % N-methylolacrylamide.

19. In a wood adhesive composition comprising an aqueous polymer emulsion and, optionally, filler, crosslinking resin and acidic metal salt catalyst, the improvement which comprises as the aqueous polymer emulsion the vinyl acetate/N-methylolacrylamide copolymer emulsion of claim 1.

20. In a wood adhesive composition comprising an aqueous polymer emulsion and, optionally, filler, crosslinking resin and acidic metal salt catalyst, the improvement which comprises as the aqueous polymer emulsion the vinyl acetate/N-methylolacrylamide copolymer emulsion of claim 14.

* * * * *